United States Patent
Li et al.

(10) Patent No.: US 10,151,351 B2
(45) Date of Patent: Dec. 11, 2018

(54) FRICTION WEED

(71) Applicant: GM Global Technology Operations LLC, Detroit, MI (US)

(72) Inventors: Huaxin Li, Rochester Hills, MI (US); Scott William Heitzenrater, Orion, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 235 days.

(21) Appl. No.: 15/144,338

(22) Filed: May 2, 2016

(65) Prior Publication Data

US 2016/0368082 A1    Dec. 22, 2016

Related U.S. Application Data

(60) Provisional application No. 62/182,983, filed on Jun. 22, 2015.

(51) Int. Cl.

| | |
|---|---|
| *F16D 1/068* | (2006.01) |
| *B23K 20/12* | (2006.01) |
| *B23K 20/227* | (2006.01) |
| *B23K 20/22* | (2006.01) |
| *B23K 101/00* | (2006.01) |
| *B23K 103/20* | (2006.01) |

(52) U.S. Cl.
CPC .............. *F16D 1/068* (2013.01); *B23K 20/12* (2013.01); *B23K 20/129* (2013.01);
(Continued)

(58) Field of Classification Search
CPC .. B23K 20/12; B23K 20/129; B23K 20/2275; B23K 2201/008; B23K 2203/20; F16B 5/08; F16C 2226/36; F16D 1/027; F16D 1/068; F16L 13/02; F16L 13/0209; Y10T 403/472; Y10T 403/473; Y10T 403/477;
(Continued)

(56) References Cited

U.S. PATENT DOCUMENTS

| | | | | |
|---|---|---|---|---|
| 4,242,889 A | * | 1/1981 | Muller | .................... F16D 1/076 464/113 |
| 4,919,987 A | * | 4/1990 | Manner | ............... B29C 65/0672 156/295 |

(Continued)

FOREIGN PATENT DOCUMENTS

| | | |
|---|---|---|
| CN | 101142048 A | 3/2008 |
| CN | 102211249 A | 10/2011 |

(Continued)

OTHER PUBLICATIONS

Handbook of Plastics Joining: A Practice Guide. Troughton, Michael. Sep. 4, 2008. William Andrew Inc. Second Edition. pp. 54-55.*

*Primary Examiner* — Josh Skroupa

(57) ABSTRACT

A weld includes a first component and a second component. The first component includes a fay surface with one or more grooves. The second component includes a surface that is configured to mate with the fay surface of the first component. The fay surface of the first component and the surface of the second component form a friction weld when the two surfaces are mated together and relative motion between the first component and the second component generates heat through mechanical friction between the two components.

16 Claims, 6 Drawing Sheets

(52) U.S. Cl.
CPC .... *B23K 20/2275* (2013.01); *B23K 2101/008* (2018.08); *B23K 2103/20* (2018.08); *Y10T 403/478* (2015.01)

(58) Field of Classification Search
CPC ............. Y10T 403/478; Y10T 403/479; Y10T 403/4966; Y10T 403/4991; Y10T 403/64
USPC ........ 403/267, 268, 270–272, 282, 285, 335
See application file for complete search history.

(56) References Cited

U.S. PATENT DOCUMENTS

| | | | | |
|---|---|---|---|---|
| 5,167,310 | A * | 12/1992 | Fischer | F16D 13/644 |
| | | | | 403/271 |
| 6,588,970 | B1 * | 7/2003 | Natrop | B29C 66/1312 |
| | | | | 403/270 |
| 8,635,982 | B2 * | 1/2014 | Scharp | B23K 20/129 |
| | | | | 123/193.1 |
| 9,550,348 | B2 * | 1/2017 | Bhosale | B29C 65/08 |
| 2013/0180728 | A1 * | 7/2013 | Hugghins | B23K 20/129 |
| | | | | 166/378 |

FOREIGN PATENT DOCUMENTS

| | | | | |
|---|---|---|---|---|
| DE | 2457392 A1 * | 6/1975 | ........... | B23K 20/129 |
| FR | 2545022 A3 * | 11/1984 | ........... | B23K 20/129 |
| JP | 08141755 A | 6/1996 | | |
| WO | WO-9630663 A1 * | 10/1996 | ........... | B23K 20/129 |

* cited by examiner

FRICTION WEED

RELATED APPLICATION

This application claims the benefit of U.S. Provisional Patent Application No. 62/182,983, filed on Jun. 22, 2015, the entire contents of which are incorporated herein by reference.

FIELD

The present disclosure relates to weld. More specifically, the present disclosure relates to a friction weld.

BACKGROUND

The statements in this section merely provide background information related to the present disclosure and may or may not constitute prior art.

In a typical motor vehicle, certain components are welded together. Some welds involve components made of different alloys. For example, a lighter alloy such as aluminum or magnesium may be joined with a heavier alloy such as steel. Because of the physical and metallurgical property differences between these alloys, the joint strength may not be strong enough for certain applications. Specifically, brittle intermetallic compound formation and high residual stresses in the weld joint resulting from the use of alloys with different properties may limit the joint strength.

Accordingly, there is a need for a weld that joins alloys with different metallurgical and physical properties with a higher joint strength.

SUMMARY

In one aspect, a weld includes a first component and a second component. The first component includes a fay surface with one or more grooves. The second component includes a surface that is configured to mate with the fay surface of the first component. The fay surface of the first component and the surface of the second component forms a friction weld when the two surfaces are mated together and relative motion between the first component and the second component generates heat through mechanical friction between the two components.

In another aspect, an assembly with a first component and a second component includes a fay surface with one or more grooves on the first component, and a surface on the second component that mates with the fay surface of the first component. The fay surface of the first component and the surface of the second component form a friction weld when the two surfaces are mated together and relative motion between the first component and the second component generates heat through mechanical friction between the two components.

One or more of the following features may also be included in any of the above aspects: the one or more grooves has a depth, d; the one or more grooves is a plurality of grooves; each of the plurality of grooves has the same depth, d; each of the plurality of grooves has a different depth, d; each of the plurality of grooves has the same width, w; each of the plurality of grooves has a different width, w; the fay surface is characterized by an inner angle, α, and an outer angle, β; the inner angle, α, is between 0° to about 45°, and the outer angle, β, is between 0° to about 45°; and the fay surface includes one or more radial notches.

In yet another aspect, an assembly with a first component and a second component joined together by a friction weld includes a fay surface with a plurality of grooves on the first component, and a fay surface with a plurality of groove on second component that mates with the fay surface of the first component. The fay surface of the first component and the fay surface of the second component form a friction weld when the two surfaces are mated together and relative motion between the first component and the second component generates heat through mechanical friction between the two components. This aspect may be further characterized by the following feature: each of the plurality of grooves on the first surface and on the second surface has the same depth, d, and each of the plurality of grooves on the first surface and on the second surface has the same width, d.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1A:
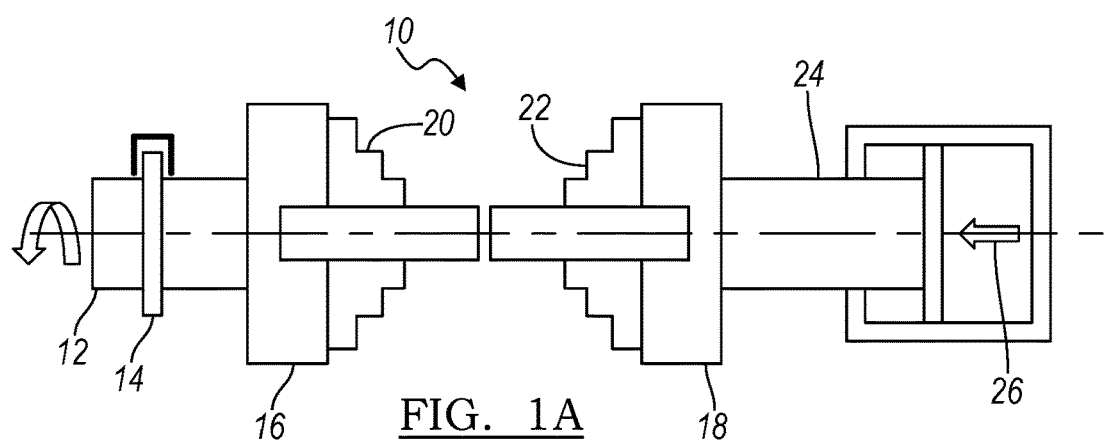
FIG. 1A is a schematic diagram of a rotational friction welding system.

Referring now to the drawings, a rotational friction weld system is shown in FIG. 1A at 10. The system 10 includes a motor 12 that rotates a rotating chuck 16. A brake 14 is employed to control the rotational speed of the rotating chuck 16. The system 10 further includes a non-rotating chuck 18 coupled to a hydraulic cylinder 24.

When the system 10 is in use, the rotating chuck 16 holds a first work piece or component 20 and the non-rotating chuck 18 holds a second work piece or component 22. The first and second work pieces are made of dissimilar materials. For example, in certain arrangements the first work piece 20 is a steel gear and the second work piece 22 is an aluminum clutch shell.

Figure 1B:
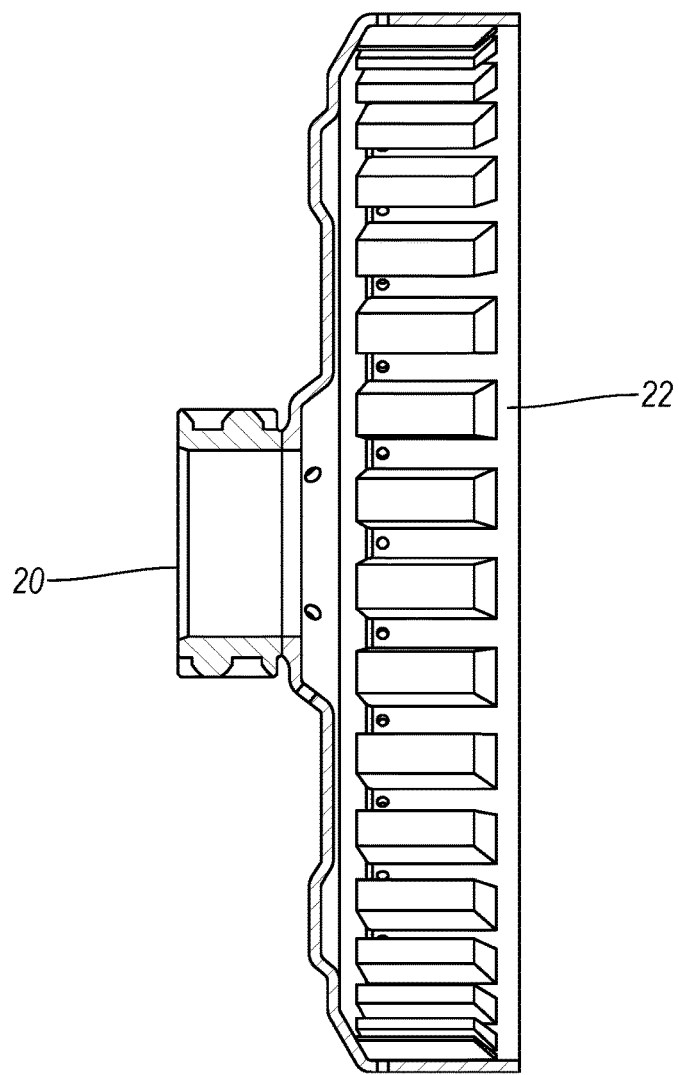
FIG. 1B is side view of two components welded together with the system shown in FIG. 1A.

The motor 12 spins the rotating chuck 16 and hence the first work piece 20 at a high rate of rotation. When the first work piece 20 is spinning at the proper speed, the hydraulic cylinder 24 moves the non-rotating chuck 18 and hence the second work piece 22 towards the first work piece 20 in the direction of the arrow 26. Accordingly, the two work pieces 20 and 22 are forced together under pressure to form a frictional weld that joins the two work pieces together as shown in FIG. 1B. The spinning is stopped to allow the weld to set. In conventional frictional weld systems, the physical and metallurgical property differences between the different alloys results in a weakened weld. In particular, brittle intermetallic compound formation (such as, for example, $Al_5Fe_2$, $Al_2Fe$, $FeAl$, $Fe_3Al$ and $Al_6Fe$) and high residual stresses limit the joint strength between the two work pieces.

Figure 2A:
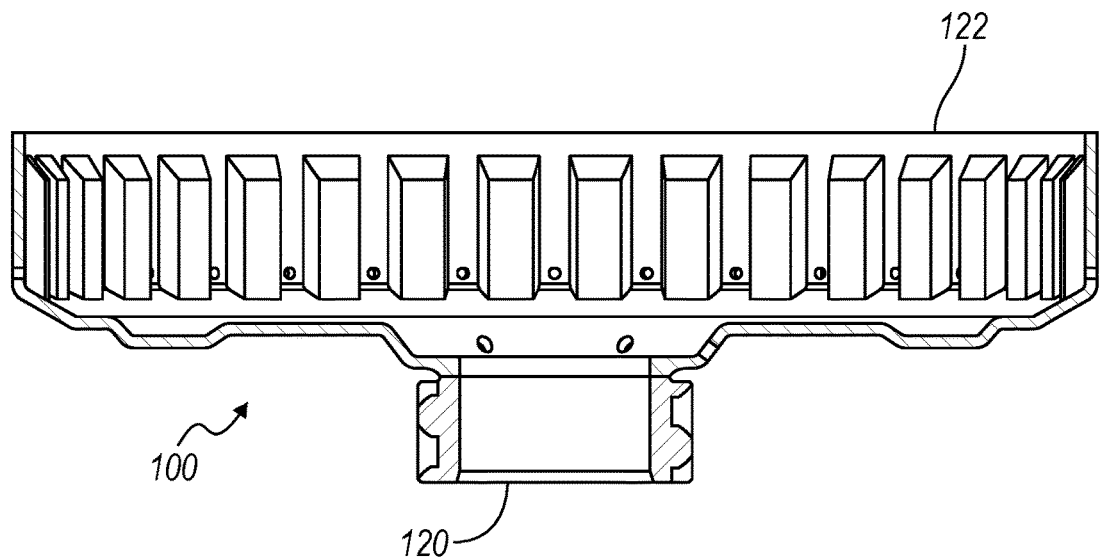
FIG. 2A is a side view of two components joined together with a rotational friction weld in accordance with the principles of the present invention.
Figure 2B:
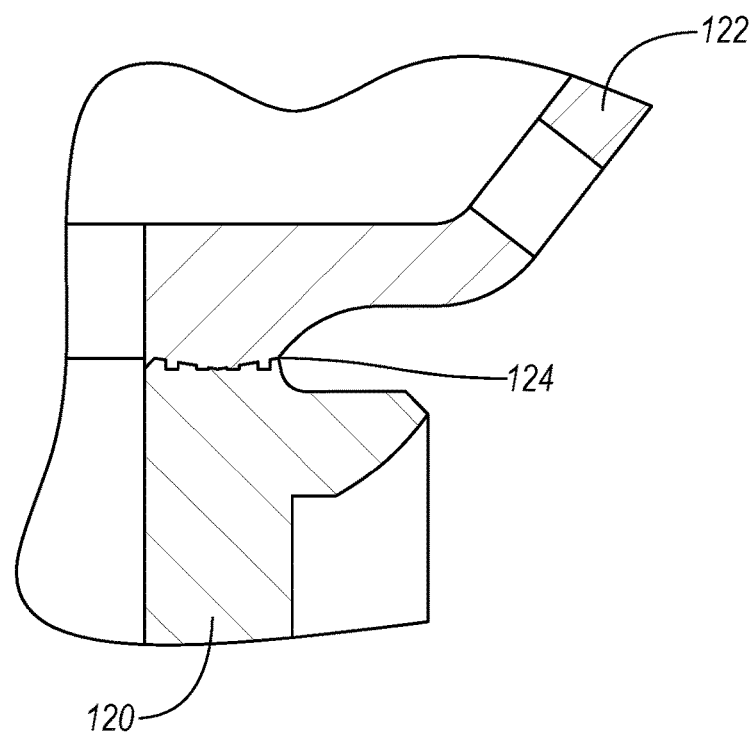
FIG. 2B is a close-up view of the weld between the two components shown in FIG. 2A in accordance with the principles of the present invention.
Figure 2C:
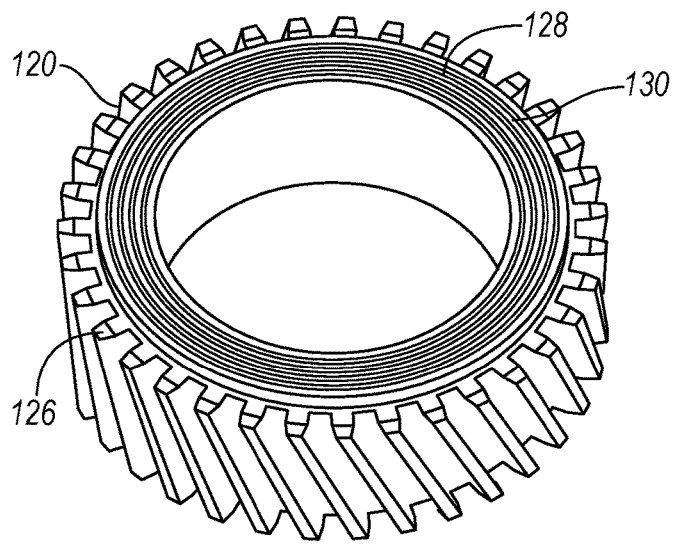
FIG. 2C is a perspective view of one of the components shown in FIG. 2A in accordance with the principles of the present invention.

Turning now to FIGS. 2A and 2B, there is shown a frictional weld 124 formed between a first work piece 120 and a second work piece 122 in accordance with the principles of the present invention. The two work pieces are generally made of dissimilar materials. For example, the first work piece 120 can be made of steel and the second work piece 122 can be made of aluminum or magnesium. Moreover, the first work piece 120 can be a gear with a set of teeth 126 as illustrated in FIG. 2C.

Figure 2D:
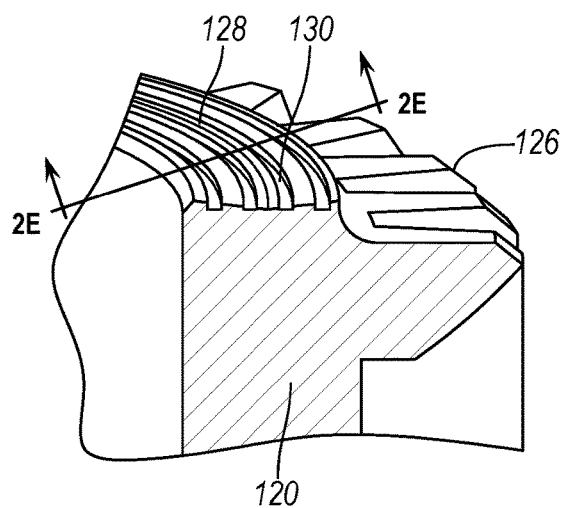
FIG. 2D is a close-up view of a fay surface of the component shown in FIG. 2C in accordance with the principles of the present invention.
Figure 2E:
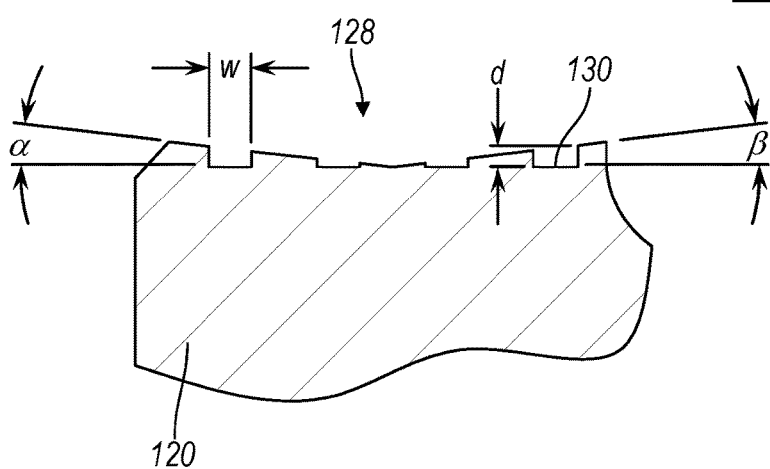
FIG. 2E is a cross-sectional view of the fay surface shown in FIG. 2D in accordance with the principles of the present invention.

Referring further to FIGS. 2D and 2E, the first work piece 120 includes a fay surface 128 with a set of grooves 130 that mates with a corresponding surface of the second work piece 122. The set of grooves 130 can be just one groove or a plurality of grooves. In the example shown in FIGS. 2C, 2D and 2E, the set of grooves 130 includes four grooves. Each groove has a depth, d, and a width, w. The depths of each groove can be the same or they can all be different. The widths of each groove can be the same or they can all be different. In various arrangements, the groove depth, d, can be between 0 to about 3 mm and the width, w, can be between about 0.2 to 2 mm. The fay surface 128 is characterized by an inner angle, α, and an outer angle, β. The inner angle, α, can vary between 0° to about 45°, and the outer angle, β, can also vary between 0° to about 45°.

When the first work piece 120 and the second work piece 122 are joined together by a rotational friction weld process, the softer alloy of the second work piece 122 is pushed into the grooves 130 of the first work piece 120. The use of the grooves 130 increases joint strength of the weld 124 at the interface between the work pieces 120, 122 by increasing the joining area, reducing residual stresses by better stress distribution and adding mechanical bonding between the work pieces in addition to metallurgical bonding of the two alloys. Note, that the second work piece 122 may also include a grooved fay surface as well that mates with the fay surface 128 of the first work piece 120. The fay surface of the second work piece 122 can be angled or unangled.

Figure 3A:
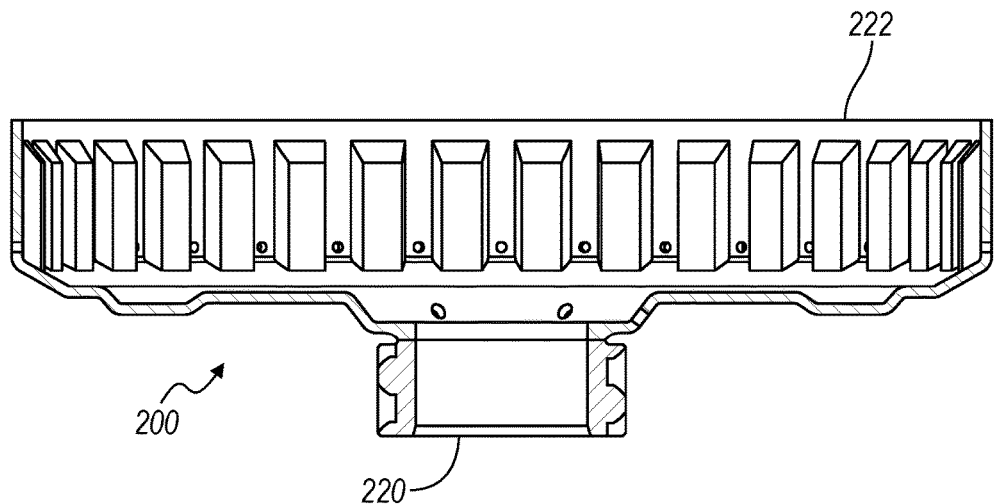
FIG. 3A is a side view of two components joined together with another rotational friction weld in accordance with the principles of the present invention.
Figure 3B:
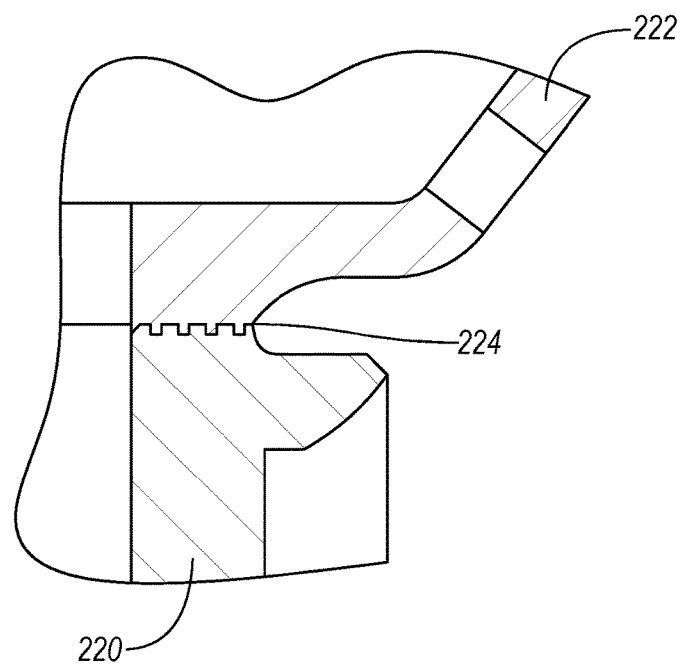
FIG. 3B is a close-up view of the weld between the two components shown in FIG. 3A in accordance with the principles of the present invention.
Figure 3C:
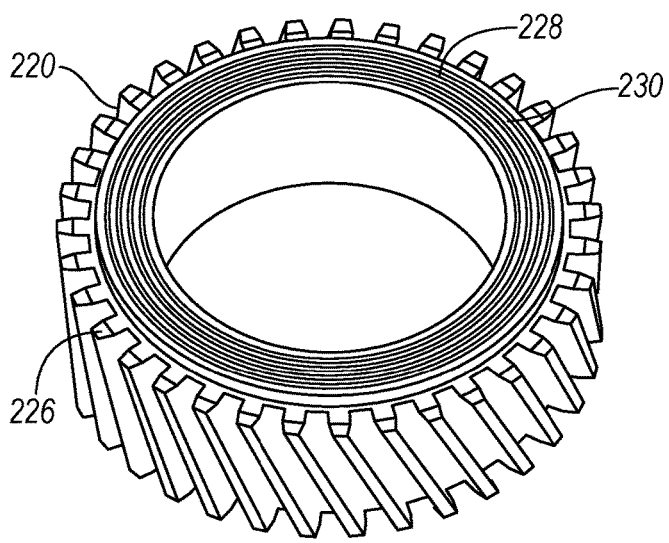
FIG. 3C is a perspective view of one of the components shown in FIG. 3A in accordance with the principles of the present invention.

Referring now to FIGS. 3A and 3B, there is shown a frictional weld 224 formed between a first work piece 220 and a second work piece 222 in accordance with the principles of the present invention. The two work pieces are generally made of dissimilar materials. For example, the first work piece 220 can be made of steel and the second work piece 222 can be made of aluminum or magnesium. Moreover, the first work piece 220 can be a gear with a set of teeth 226 as illustrated in FIG. 3C.

Figure 3D:
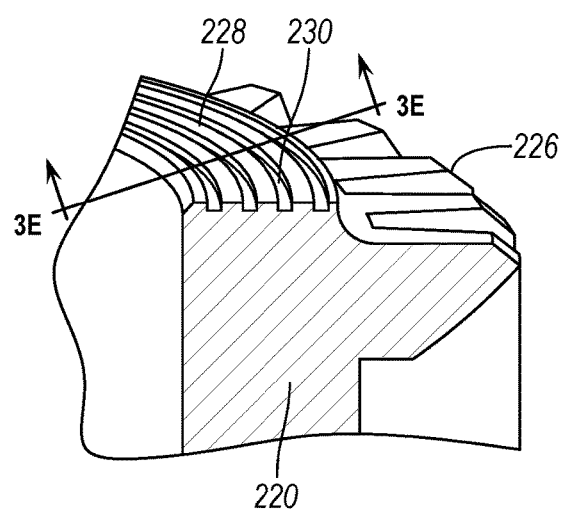
FIG. 3D is a close-up view of a fay surface of the component shown in FIG. 3C in accordance with the principles of the present invention.
Figure 3E:
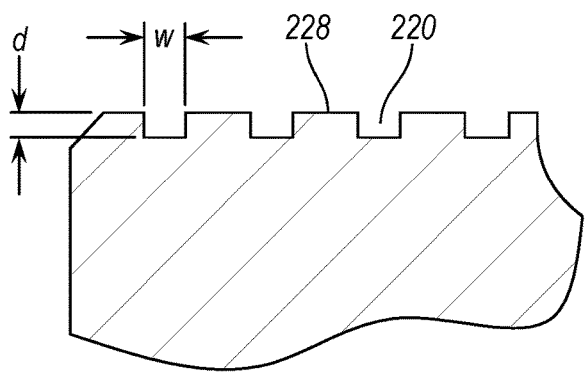
FIG. 3E is a cross-sectional view of the fay surface shown in FIG. 3D in accordance with the principles of the present invention.

Referring further to FIGS. 3D and 3E, the first work piece 220 includes a fay surface 228 with a set of grooves 230 that mates with a corresponding surface of the second work piece 222. The set of grooves 230 can be just one groove or a plurality of grooves. In the example shown in FIGS. 3C, 3D and 3E, the set of grooves 230 includes four grooves. Each groove has a depth, d, and a width, w. The depths of each groove can be the same or they can all be different. The widths of each groove can be the same or they can all be different. In various arrangements, the groove depth, d, can be between 0 to about 3 mm and the width, w, can be between about 0.2 to 2 mm. The fay surface 128 is characterized by a flat surface.

When the first work piece 220 and the second work piece 222 are joined together by a rotational friction weld process, the softer alloy of the second work piece 222 is pushed into the grooves 230 of the first work piece 220. The use of the grooves 230 increases joint strength of the weld 224 at the interface between the two work pieces 220, 222 by increasing the joining area, reducing residual stresses by better stress distribution and adding mechanical bonding between the work pieces in addition to metallurgical bonding of the two alloys. Note, that the second work piece 222 may also include a grooved fay surface as well that mates with the fay surface 228 of the first work piece 220.

Figure 4A:
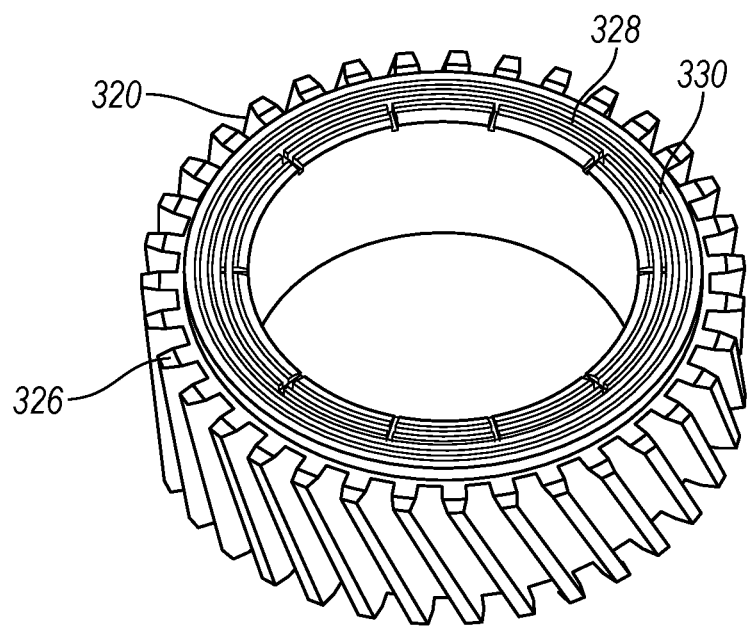
FIG. 4A is a perspective a component with a fay surface in accordance with the principles of the present invention.
Figure 4B:
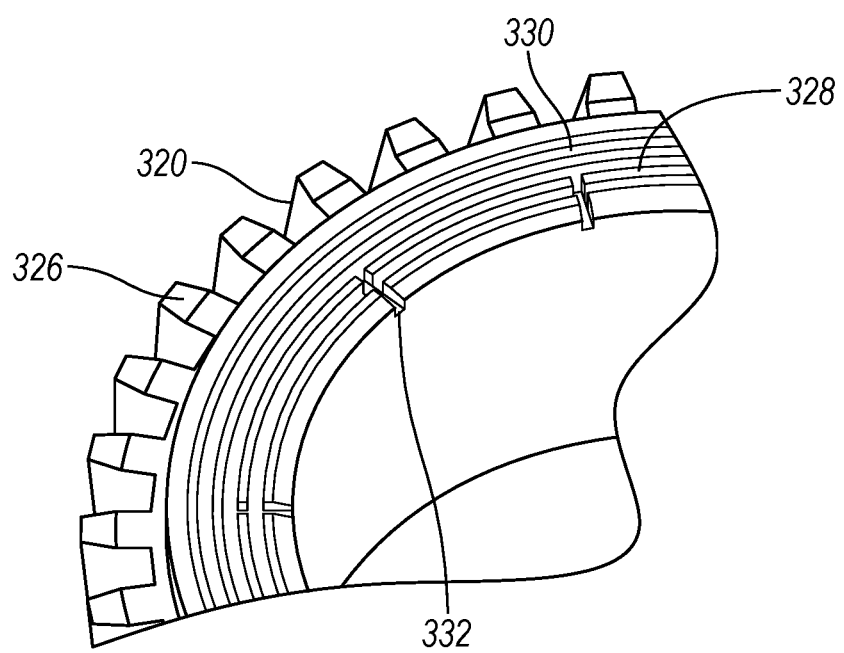
FIG. 4B is a close-up view of the fay surface shown in FIG. 4A in accordance with the principles of the present invention.

Referring now to FIGS. 4A and 4B, there is shown another work piece 320 with a fay surface 328 in accordance with the principles of the present invention. The work piece 320 can be a gear with a set of teeth 326.

The work piece 320 includes a fay surface 328 with a set of grooves 330 that mates with a corresponding surface of a second work piece similar to any of the second work pieces described previously. The set of grooves 330 can be just one groove or a plurality of grooves. Each groove of the set of grooves 330 has a depth, d, and a width, w, as described above. The depths of each groove can be the same or they can all be different. The widths of each groove can be the same or they can all be different. The fay surface 328 also includes radial notches 332 that enhances the joining of the work piece 320 to a corresponding second work piece.

When the work piece 320 and a second work piece are joined together by a rotational friction weld process, the softer alloy of the second work piece is pushed into the grooves 330 and the radial notches 332 of the work piece 320. The use of the grooves 330 and the radial notches increases joint strength of the weld at the interface between the two work pieces by increasing the joining area, reducing residual stresses by better stress distribution and adding mechanical bonding between the work pieces in addition to metallurgical bonding of the two alloys. Note, that the fay surface 320 may have angled surface like those of fay surface 120 or the fay surface 220 discussed above.

The description of the invention is merely exemplary in nature and variations that do not depart from the gist of the invention are intended to be within the scope of the invention. Such variations are not to be regarded as a departure from the spirit and scope of the invention.

What is claimed is:

1. A friction weld interface device comprising:
a first component having a fay surface with one or more circular grooves, the fay surface having one or more notches that extend radially through the one or more grooves, each of the one or more notches being perpendicular to the one or more grooves at the intersection of the one or more notches and the one or more grooves; and
a second component with a surface that mates with the fay surface of the first component,
wherein the fay surface of the first component and the surface of the second component form the friction weld when the two surfaces are mated together and relative motion between the first component and the second component generates heat through mechanical friction between the two components.

2. The friction weld interface device of claim 1 wherein the one or more grooves has a depth, d.

3. The friction weld interface of claim 2 wherein the one or more grooves is a plurality of grooves.

4. The friction weld interface of claim 3 wherein each of the plurality of grooves has the same depth, d.

5. The friction weld interface of claim 3 wherein each of the plurality of grooves has a different depth, d.

6. The friction weld interface of claim 3 wherein each of the plurality of grooves has the same width, w.

7. The friction weld interface of claim 3 wherein each of the plurality of grooves has a different width, w.

8. The friction weld interface of claim 1 wherein the fay surface is characterized by an inner angle, α, and an outer angle, β.

9. The friction weld interface of claim 8 wherein the inner angle, α, is between 0° to about 45°, and the outer angle, β, is between 0° to about 45°.

10. An assembly with a first component and a second component comprising:
a fay surface with one or more circular grooves on the first component, the fay surface having one or more notches that extend radially through the one or more grooves, each of the one or more notches being perpendicular to the one or more grooves at the intersection of the one or more notches and the one or more grooves; and
a surface on the second component that mates with the fay surface of the first component,
wherein the fay surface of the first component and the surface of the second component form a friction weld when the two surfaces are mated together and relative motion between the first component and the second component generates heat through mechanical friction between the two components.

11. The assembly of claim 10 wherein the one or more grooves is a plurality of grooves.

12. The assembly of claim 11 wherein each of the plurality of grooves has the same depth, d.

13. The assembly of claim 11 wherein each of the plurality of grooves has a different depth, d.

14. The assembly of claim 11 wherein each of the plurality of grooves has the same width, w.

15. The assembly of clam 11 wherein each of the plurality of grooves has a different width, w.

16. The assembly of claim 10 wherein the fay surface is characterized by an inner angle, α, and an outer angle, β.

* * * * *